Jan. 5, 1960 A. J. ELIAS 2,920,213

TRANSISTOR-MAGNETIC CORE BI-STABLE CIRCUIT

Filed Dec. 24, 1956 2 Sheets-Sheet 1

INVENTOR.
ARTHUR J. ELIAS
BY F. H. Henson
AGENT

Jan. 5, 1960 A. J. ELIAS 2,920,213
TRANSISTOR-MAGNETIC CORE BI-STABLE CIRCUIT
Filed Dec. 24, 1956 2 Sheets-Sheet 2

INVENTOR.
ARTHUR J. ELIAS
BY F. H. Henson
AGENT

United States Patent Office 2,920,213

Patented Jan. 5, 1960

2,920,213

TRANSISTOR-MAGNETIC CORE BI-STABLE CIRCUIT

Arthur J. Elias, Los Angeles, Calif., assignor to General Dynamics Corporation, Rochester, N.Y., a corporation of Delaware Application December 24, 1956, Serial No. 630,255

6 Claims. (Cl. 307—88)

Figure 1:
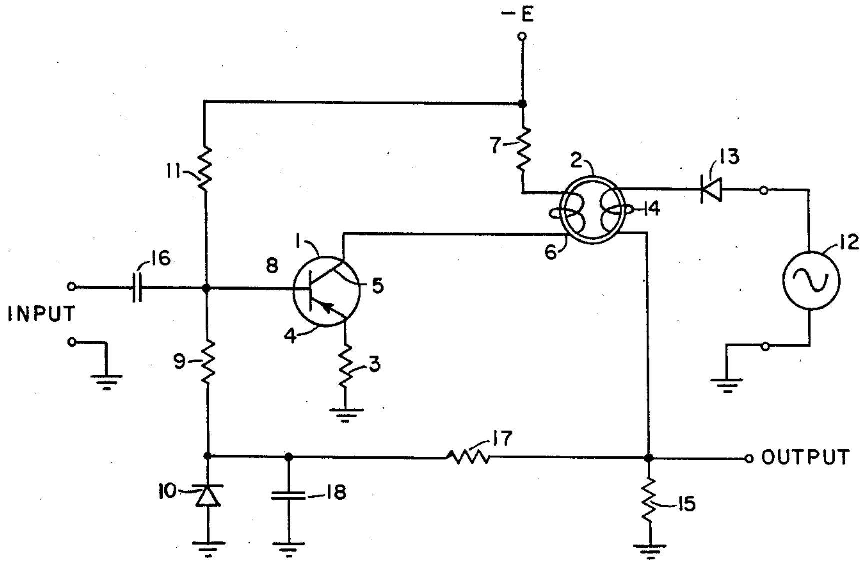

This invention relates in general to triggered circuits and, more particularly, although not exclusively, to triggered bi-stable circuits which employ a magnetic core member as a principal element.

Magnetic core members have found increasing use in electrical circuits in recent years because of their small size, small power requirements, and durability. To my knowledge, however, magnetic core members have never been used, prior to this invention, as principal elements in bi-stable or flip-flop circuits of the type in which a steady output signal is required as long as the circuit is operated to one or the other of its stable states of operation. Conventionally, the magnetic core is used as a memory device which is triggered to either one or the other of its stable points of remanence and an indication of the magnetic state of the core is noted by observation of a transient signal accompanying a change of state.

It is the general object of this invention to provide a new and improved bi-stable circuit.

It is a more particular object of this invention to provide a new and improved bi-stable circuit which utilizes a magnetic core member as one of its principal elements.

In accordance with the present invention, a transistor and a magnetic core are cross-coupled to form a bi-stable circuit. A control winding, which is disposed in inductive relationship with the magnetic core member, is connected to be energized from a source of direct current whenever the transistor is conductive. A source of pulsating current is coupled to an output circuit through other winding means in inductive relationship with said core. The control winding is so poled and the magnitude of the direct current is such that pulsating current signals are blocked from the output circuit whenever the transistor is conductive and are applied to said output circuit whenever the transistor is non-conductive. The base emitter junction of the transistor is biased in the forward direction for conduction when no signals appear in the output circuit and is biased for non-conduction whenever signals appear in the output circuit. The bi-stable circuit is triggered from one stable condition to the other by the application of pulses of suitable polarity to the base electrode of the transistor. Thus, it can be seen that once triggered conductive, the transistor remains conductive until it is triggered non-conductive and is then held non-conductive by signals appearing in the output circuit until it is once more triggered conductive. Since signals appear in the output circuit as long as the bi-stable circuit is operated to one of its stable conditions, the circuit can be used as a memory unit, which gives a steady indication of stored information, in a digital computer or the like. Also, it will be obvious to those skilled in the art that the circuit can be used as an electronic switch for switching A.-C. signals.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings which comprise four figures on two sheets.

Figure 2:
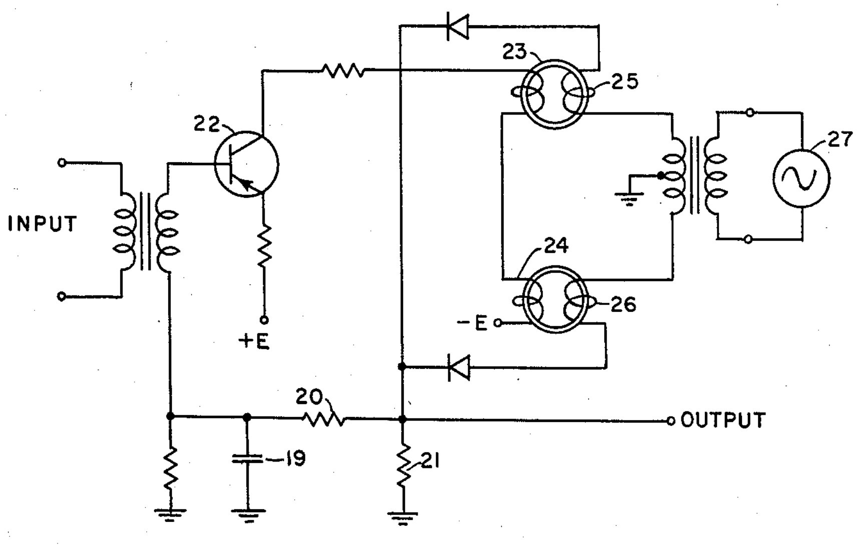
Figure 3:
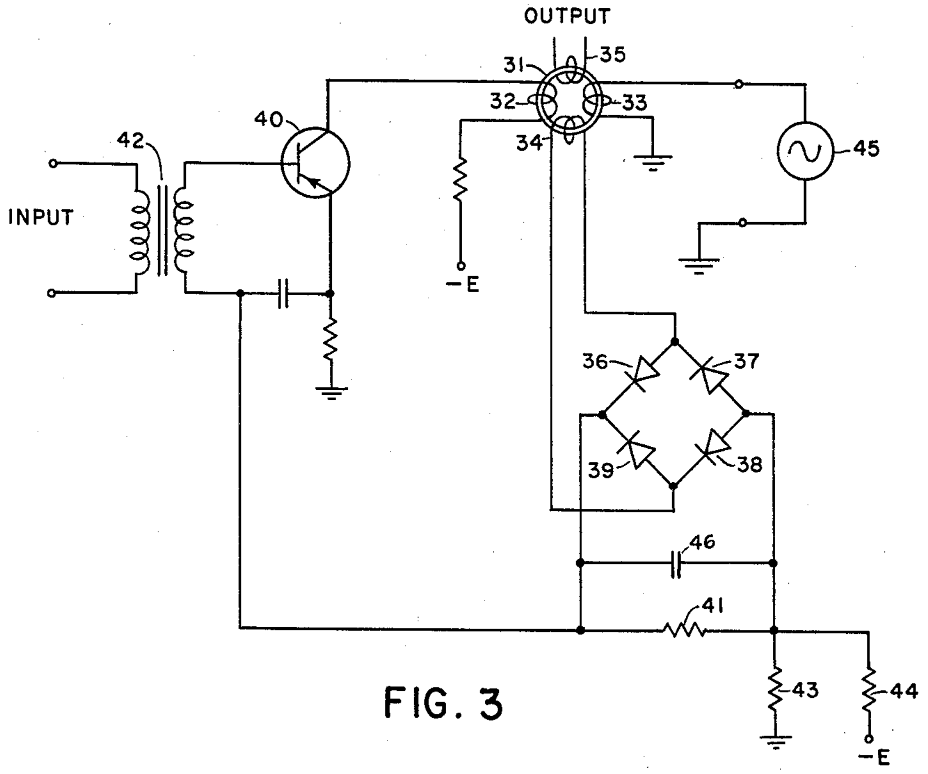
Figure 4:
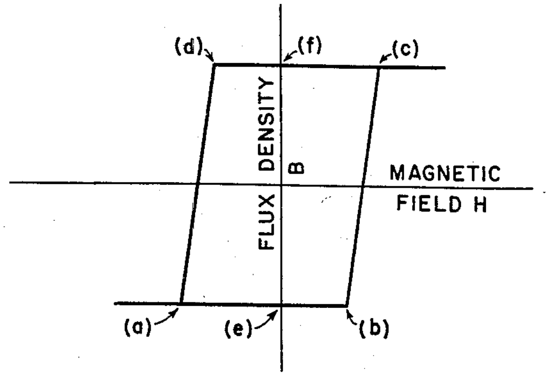

Fig. 1 shows one embodiment of the invention in which the magnetic core is used as a self-saturating reactor, Fig. 2 shows another embodiment of the invention in which two magnetic cores are used as self-saturating reactors, Fig. 3 shows still another embodiment of the invention in which the magnetic core is used as a saturable transformer, and Fig. 4 shows a hysteresis loop of the magnetic material used in the magnetic core members employed in the present invention.

Referring to Fig. 1, it can be seen that the bi-stable circuit comprises p-n-p junction transistor 1 and a magnetic core 2 as its principal elements. If it be assumed that transistor 1 is conductive, direct current flows from ground through resistor 3, emitter electrode 4, collector electrode 5, through control winding 6 on magnetic core 2, and through resistor 7 to a source of negative potential, marked —E. After being triggered conductive, transistor 1 remains conductive since its base electrode 8 is returned to a potential which is negative with respect to the potential of its emitter electrode 4, which is returned through resistor 3 to ground. The base 8 of transistor 1 is returned to a potential equal to the voltage division across resistors 9 and 11, which are returned through diode 10 to ground, and to —E, respectively. A source of pulsating current, comprising oscillator 12 and diode 13, is connected to the upper terminal of output winding 14 on magnetic core member 2. The lower terminal of winding 14 is connected through load resistor 15 to ground. When transistor 1 is conductive and direct current flows in control winding 6, the magnetic core 2 is driven to saturation in the negative direction, as indicated at point (*a*) on the curve of Fig. 4. Each positive pulse coupled through diode 13 is of sufficient magnitude to trigger the state of the core from point (*a*) past the knee of the curve, marked (*b*), to point (*c*). At the termination of the positive pulse, the direct current flowing in winding 6, of course, drives the state of the core past the knee of the curve, marked point (*d*), and back to point (*a*). Since the inductance and thus the impedance of winding 14 is very high while the curve (*a*) (*b*) (*c*) (*d*) is being traced, the pulsating current is effectively blocked from load resistor 15.

When a positive trigger pulse is applied through capacitor 16 to base 8 of transistor 1, transistor 1 is rendered non-conductive and control winding 6 is de-energized. If control winding 6 is de-energized during a negative half-cycle of the signal produced by oscillator 12 and there is, therefore, no positive pulse coupled through diode 13 to output winding 14, the flux density of the core returns to the negative point of remanence, marked point (*e*), in Fig. 4. The next positive pulse coupled through diode 13 drives the state of the core to point (*c*). With winding 6 de-energized, further positive pulses coupled through diode 13 to winding 14 drive the flux density of the core between point of remanence (*f*) and some point to the right of point (*c*). Since the core now remains in the positive saturated condition, the impedance of winding 14 is low and the positive half-cycles of current passed by diode 13 appear across load resistor 15. The signals appearing across load resistor 15 are coupled through resistor 17 and resistor 9 to base 8 and serve to hold transistor 1 non-conductive. The charge built up on filter capacitor 18 by each positive pulse is used to hold the base of transistor 1 positive between pulses of the pulsating current. Capacitor 18, of course, starts to discharge through resistors 17 and 15 between pulses but the time constant of the circuit is sufficiently great that the base 8 remains positive as long as pulses are produced across load resistor 15 in the output circuit.

It can be seen that in this embodiment of the invention since transistor 1 may be triggered non-conductive and winding 6 de-energized at a time when a positive pulse is not coupled through diode 13 to winding 14, it is important that either the pulse which triggers transistor 1 non-conductive be rather wide, or that the frequency of generator 12 be rather high, so as to assure that the transistor 1 remains non-conductive until signals appear in the output circuit to maintain it non-conductive.

When a negative trigger pulse is applied through capacitor 16 to the base of transistor 1, transistor 1 is again rendered conductive, direct current flows in control winding 6, and signals no longer appear across load resistor 15 in the output circuit. An output may be taken from the circuit either from across load resistor 15, as shown, or at the collector of transistor 1, or load resistor 15 may be replaced with a neon tube, or the like, for the purpose of giving a visible indication of the operated condition of the bi-stable circuit.

The embodiment of the invention shown in Fig. 2 is slightly different in operation than the circuit of Fig. 1 since the transformer input is used and two magnetic core members and two diodes are used to give full-wave rectification. In this embodiment of the invention, the time constant of capacitor 19 and resistors 20 and 21 can be much shorter than the time constant of corresponding capacitor 18 and resistors 17 and 15 of Fig. 1. Also, the width or duration of the impulse which triggers transistor 22 non-conductive or the frequency of oscillator 27 are not critical in this embodiment of the invention since a positive pulse is applied to the output circuit through either winding 25 or winding 26 regardless of the instantaneous value of the output signal from oscillator 27 at the time that transistor 22 is rendered non-conductive. The principle of operation of the circuit of Fig. 2 is identical to that of Fig. 1. When transistor 22 is conductive, direct current flows in control windings 23 and 24, both magnetic cores are driven to negative saturation, and signals are effectively blocked from load resistor 21 in the output circuit by the high impedance of windings 25 and 26.

Referring to Fig. 3, it can be seen that the magnetic core member 31 is used as a saturable transformer. The core 31 has a first or control winding 32, a second winding 33, a third or output winding 34, and an optional auxiliary output winding 35. The oscillator 45 is connected across winding 33 and a full-bridge rectifier, comprising diodes 36—39, inclusive, is connected across the output winding 34. Control winding 32 is so poled that when transistor 40 is conductive, the core is carried into positive saturation past point (c) on the curve of Fig. 4. The magnitude of the alternating current signals produced by oscillator 45 is such that the core remains in positive saturation over the entire signal cycle and no signals appear in the output windings 34 or 35. Transistor 40 is held conductive after being triggered conductive since its base is returned to a potential equal to the voltage division across resistors 43 and 44, through the secondary winding of input transformer 42, and resistor 41.

When transistor 40 is triggered non-conductive by the application of a positive pulse to its base electrode, control winding 32 is, of course, de-energized. During negative half-cycles of the alternating current signal supplied by oscillator 45, core 31 is triggered from positive saturation to negative saturation, and during positive half-cycles of the alternating current signals, the core is triggered from negative saturation to positive saturation. Output signals are, of course, produced in output windings 34 and 35 while the curve (a)(b)(c)(d) is being traced. Signals appearing in output winding 34 are rectified and applied across load resistor 41 and filter capacitor 46. The full-bridge rectifier diodes are so poled that a positive potential is applied to the base of transistor 40 to hold said transistor non-conductive. Transistor 40 is, of course, triggered condctive by a negative pulse coupled through input transformer 42. When the circuit is being used as an electronic switch for alternating current signals, it may be desirable to provide an auxiliary output winding, such as 35, on core member 31 since the load impedance may differ considerably from the feedback impedance presented to winding 34 and thus require a different number of turns on windings 35 and 34, respectively.

While p-n-p junction transistors have been shown in the various embodiments of the invention, it will be obvious to those skilled in the art that n-p-n junction transistors could be used in the exact same circuits by suitable reversal of the polarity of the biasing and triggering potentials.

While there has been shown and described what is considered at present to be the preferred embodiments of the invention, modifications thereto will readily occur to those skilled in the art. It is not, therefore, desired that the invention be limited to the specific arrangements shown and described and it is intended to cover in the appended claims in all such modifications as fall within the true spirit and scope of the invention.

What is claimed is:

1. A bi-stable circuit comprising a junction transistor and a magnetic core member, said transistor having base, emitter, and collector electrodes, a control winding disposed in inductive relationship with said magnetic core member, means for connecting said control winding in a series connection between said collector and a source of direct current whereby said control winding is continuously energized as long as the transistor is conductive, first biasing means for normally biasing the base and emitter junction of said transistor in the forward direction so that said transistor is normally conductive, means for applying a first trigger pulse to said transistor to overcome the bias supplied by said first biasing means and render said transistor non-conductive, a source of pulsating current, an output circuit, other winding means disposed in inductive relationship with said magnetic core member for applying pulsating current from said source of pulsating current to said output circuit only when said control winding is not energized, second biasing means effective only when pulsating current is applied to said output circuit for overcoming said first biasing means to hold said transistor non-conductive, and means for applying a second trigger pulse to said transistor to overcome the bias supplied by said second biasing means and render said transistor conductive.

2. The circuit of claim 1 wherein said other winding means disposed in inductive relationship with said magnetic core member for applying pulsating current from said source of pulsating current to said output circuit only when said control winding is not energized comprises second and third windings, means for connecting said source of pulsating current across said second winding, and means for connecting said output circuit across said third winding.

3. A bi-stable circuit comprising a junction transistor and a magnetic core member, said transistor having base, emitter, and collector electrodes, a control winding disposed in inductive relationship with said magnetic core member, means for connecting said control winding in a series connection between said collector and a source of direct current whereby said control winding is continuously energized as long as the transistor is conductive, a source of pulsating current, an output circuit, an output winding disposed in inductive relationship with said magnetic core member, means for connecting said output winding in series between said source of pulsating current and said output circuit, said control winding being so poled that signals appear in said output circuit only when said device is non-conductive, first biasing means for normally biasing the base and emitter junction of said transistor in the forward direction so that said transistor is normally conductive, means for applying a first trigger pulse to said transistor to overcome the bias supplied by said first biasing means and render said transistor non-conductive, second biasing means effective only when said signals appear in said output winding for overcoming the bias supplied by said first biasing means to hold said transistor non-conductive, and means for applying a second trigger pulse to said transistor to overcome the bias supplied by said second biasing means and render said transistor conductive.

4. A bi-stable circuit comprising a transistor and a magnetic core member, said transistor having base, emittter, and collector electrodes, a first winding disposed in inductive relationship with said magnetic core member, means for connecting said first winding, said emitter, said collector, and a source of direct current in series circuit relationship whereby direct current continuously flows through said first winding as long as said transistor is conductive, means for returning said base to a first potential of such polarity as to hold said transistor conductive, means for applying a first trigger pulse to said base to render said transistor non-conductive, a source of pulsating current, an output circuit, other winding means disposed in inductive relationship with said magnetic core member for applying pulsating current from said source of pulsating current to said output circuit only when said first winding is not conducting current, means for deriving a second potential from the pulsating current signals appearing in said output circuit, means for applying said second potential to said base to hold said transistor non-conductive, and means for applying a second trigger pulse to said base to render said transistor conductive.

5. The circuit of claim 4 wherein said other winding means disposed in inductive relationship with said magnetic core member for applying pulsating current from said source of pulsating current to said output circuit only when said first winding is not conducting current comprises second and third windings, means for connecting said source of pulsating current across said second winding, and means for connecting said output circuit across said third winding.

6. A bi-stable circuit comprising a transistor and a magnetic core member, said transistor having base, emitter, and collector electrodes, a control winding disposed in inductive relationship with said magnetic core member, means for connecting said control winding, said emitter, said collector, and a source of direct current in series circuit relationship whereby direct current continuously flows through said control winding as long as said transistor is conductive, a source of pulsating current, an output circuit, an output winding disposed in inductive relationship with said magnetic core member, means for connecting said output winding in series between said source of pulsating current and said output circuit, said control winding being so poled that signals appear in said output circuit only when said transistor is nonconductive, means for returning said base to a first potential of such polarity as to hold said transistor conductive, means for applying a first trigger pulse to said base to render said transistor non-conductive, means for deriving a second potential from signals appearing in said output circuit, means for applying said second potential to said base to hold said transistor non-conductive, and means for applying a second trigger pulse to said base to render said transistor conductive.

References Cited in the file of this patent

UNITED STATES PATENTS 2,760,086 Van Nice ---------------- Aug. 21, 1956
2,798,169 Eckert ------------------- July 2, 1957